(12) United States Patent
Ozaki et al.

(10) Patent No.: US 10,365,624 B2
(45) Date of Patent: Jul. 30, 2019

(54) SLAVE DEVICE, METHOD FOR CONTROLLING SLAVE DEVICE, AND NON-TRANSITORY COMPUTER-READABLE RECORDING MEDIUM

(71) Applicant: OMRON Corporation, Kyoto (JP)

(72) Inventors: Toshiyuki Ozaki, Ritto (JP); Yasuhiro Kitamura, Ritto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/751,455

(22) PCT Filed: Nov. 21, 2016

(86) PCT No.: PCT/JP2016/084420
§ 371 (c)(1),
(2) Date: Feb. 8, 2018

(87) PCT Pub. No.: WO2017/154272
PCT Pub. Date: Sep. 14, 2017

(65) Prior Publication Data
US 2018/0356786 A1 Dec. 13, 2018

(30) Foreign Application Priority Data
Mar. 11, 2016 (JP) ................................. 2016-048957

(51) Int. Cl.
*G05B 19/05* (2006.01)
*G05B 19/042* (2006.01)

(52) U.S. Cl.
CPC ....... *G05B 19/0423* (2013.01); *G05B 19/042* (2013.01); *G05B 19/05* (2013.01);
(Continued)

(58) Field of Classification Search
CPC ................ G05B 19/0423; G05B 19/05; G05B 2219/2231; G05B 2219/25428
See application file for complete search history.

(56) References Cited

U.S. PATENT DOCUMENTS

| 8,205,022 | B2 * | 6/2012 | Isenmann | ........... H04L 41/0806 710/305 |
| 2005/0127942 | A1 * | 6/2005 | Smith | .................. H03K 19/177 326/38 |

(Continued)

FOREIGN PATENT DOCUMENTS

| JP | 2001-202323 | 7/2001 |
| JP | 2004-220495 | 8/2004 |

(Continued)

OTHER PUBLICATIONS

IO-Link Interface and System Specification, Version 1.1.2; IO-Link Community; pp. 1-17,144-191, and 213-229; Jul. 2013. (Year: 2013).*

(Continued)

*Primary Examiner* — Glenn A. Auve
(74) *Attorney, Agent, or Firm* — JCIPRNET (57) ABSTRACT

In order to reduce the labor required in order for a user to manually input and register the identification information of a device scheduled to be connected to a slave device, a device communication management unit (10) generates configuration settings information that includes the identification information of a device (20) scheduled to be connected to a device communication port (110), on the basis of the identification information of the device (20) connected to the device communication port (110).

18 Claims, 4 Drawing Sheets

(52) U.S. Cl.
CPC ........... *G05B 2219/2231* (2013.01); *G05B 2219/25428* (2013.01)

(56) References Cited

U.S. PATENT DOCUMENTS

| | | | | |
|---|---|---|---|---|
| 2015/0003503 A1* | 1/2015 | Cassata | ........... | H02H 9/04 375/219 |
| 2016/0110304 A1* | 4/2016 | Mori | ........... | G06F 13/362 710/306 |
| 2018/0011466 A1* | 1/2018 | Murayama | ........... | G05B 19/05 |

FOREIGN PATENT DOCUMENTS

| | | |
|---|---|---|
| JP | 2007528070 | 10/2007 |
| JP | 2011198240 | 10/2011 |
| JP | 2011215814 | 10/2011 |
| JP | 2014-119912 | 6/2014 |
| JP | 2014174616 | 9/2014 |
| JP | 2016-081415 | 5/2016 |

OTHER PUBLICATIONS

IO-Link System Description Technology and Application; IO-Link Community, PROFIBUS Nutzerorganisation; 2013. (Year: 2013).*
"International Search Report (Form PCT/ISA/210) of PCT/JP2016/084420," dated Jan. 31, 2017, with English translation thereof, pp. 1-4.
"Written Opinion of the International Searching Authority (Form PCT/ISA/237) of PCT/JP2016/084420," dated Jan. 31, 2017, with English translation thereof, pp. 1-12.
"Office Action of Japan Counterpart Application," dated May 21, 2019, with English translation thereof, pp. 1-10.

* cited by examiner

SLAVE DEVICE, METHOD FOR CONTROLLING SLAVE DEVICE, AND NON-TRANSITORY COMPUTER-READABLE RECORDING MEDIUM

CROSS-REFERENCE TO RELATED APPLICATION

This application is a 371 application of international application of PCT application Ser. No. PCT/JP2016/084420, filed on Nov. 21, 2016, which claims the priority benefit of Japan application no. 2016-048957, filed on Mar. 11, 2016. The entirety of each of the above-mentioned patent applications is hereby incorporated by reference herein and made a part of this specification.

TECHNICAL FIELD

The present invention relates to a slave device that is connected to a master device via a network and includes a communication port to which a device is connected.

BACKGROUND ART

In the related art, there are known master-slave control systems including master devices and slave devices connected to the master devices via networks.

For example, the following Patent Literature 1 discloses a plant system in which a user manually inputs and registers identification information of a controller, an IO unit, and a field device scheduled to be connected to the IO unit to determine a system configuration.

CITATION LIST

Patent Literature

[Patent Literature 1]
Japanese Unexamined Patent Application Publication No. 2004-220495 (disclosed on Aug. 5, 2004).

SUMMARY OF INVENTION

Technical Problem

However, the above-described technology of the related art has a problem that user convenience is low since it is necessary for a user to manually input and register identification information of a field device to be connected to an IO unit.

The present invention is devised in view of the foregoing problem and an object of the present invention is to realize a slave device or the like in which it is not necessary for a user to manually input and register identification information of a device scheduled to be connected to the slave device.

Solution to Problem

In order to resolve the foregoing problem, according to an embodiment of the present invention, a slave device is connected to a controller which is a master device via a network and includes a communication port to which a device is connected. The slave device includes: an acquisition unit configured to acquire identification information of a device connected to the communication port from the device; and a generation unit configured to generate configuration settings information (configuration information) including identification information of a device scheduled to be connected to the communication port on the basis of the identification information acquired by the acquisition unit.

In order to resolve the foregoing problem, a control method according to according to an embodiment of the present invention is a control method of a slave device that is connected to a controller which is a master device via a network and includes a communication port to which a device is connected. The control method includes: an acquisition step of acquiring identification information of a device connected to the communication port from the device; and a generation step of generating configuration settings information including identification information of a device scheduled to be connected to the communication port on the basis of the identification information acquired in the acquisition step.

Advantageous Effects of Invention

According to the present invention, in a slave device that is connected to a master device via a network and including a communication port to which a device is connected, it is possible to obtain the advantageous effect that it is not necessary for a user to manually input and register identification information of a device scheduled to be connected to the slave device.

DESCRIPTION OF EMBODIMENTS

[First embodiment]
Hereinafter, a first embodiment of the present invention will be described in detail with reference to FIGS. 1 to 4. The same reference numerals are given to the same or equivalent portions in the drawings and the description thereof will not be repeated. To facilitate understanding of a device communication management unit 10 (slave device) according to an aspect of the present invention, an overview of a control system 1 including the device communication management unit 10 will be described with reference to FIG. 2.

Figure 2:
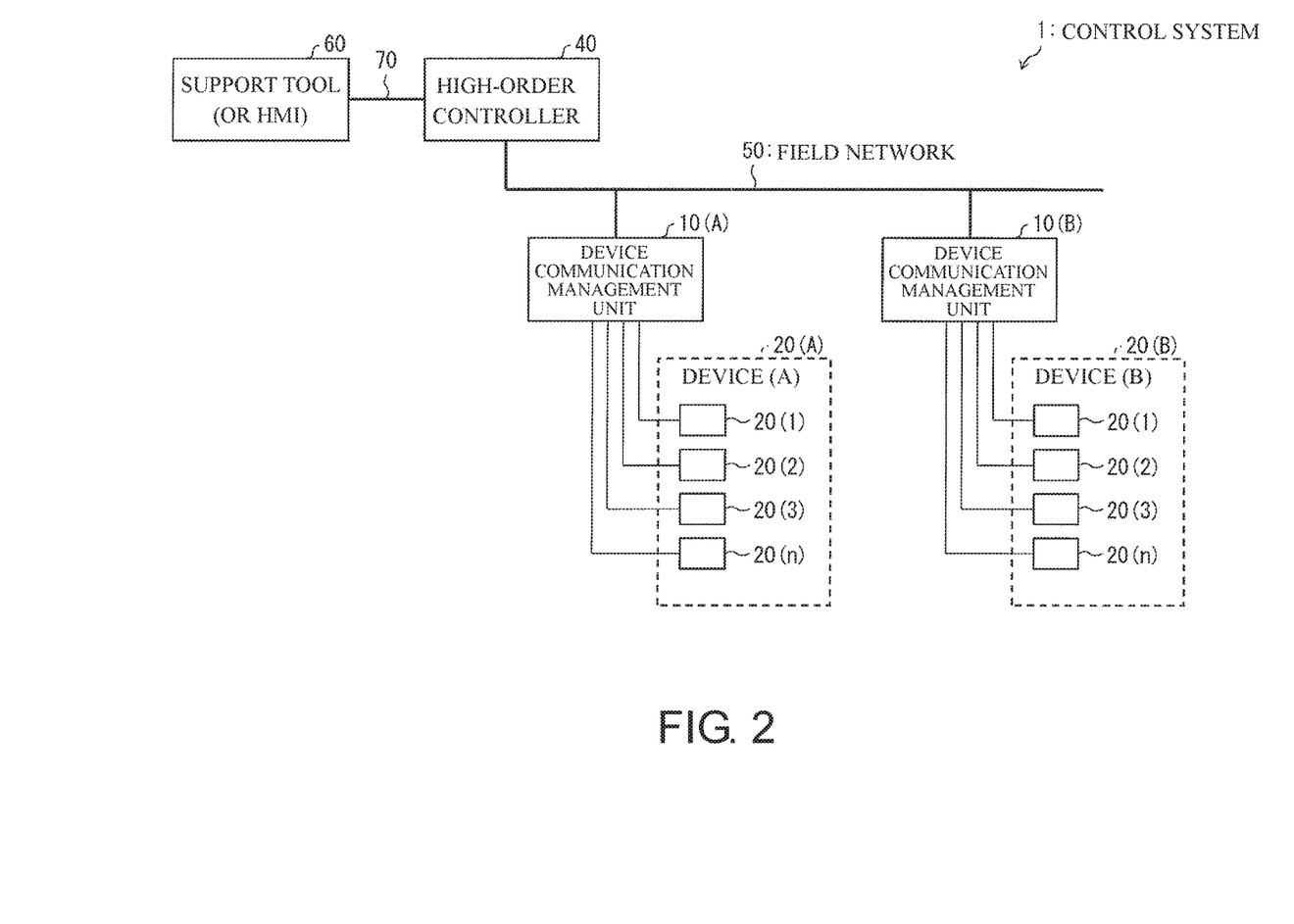
FIG. 2 is a diagram illustrating a general overview of a whole control system according to the embodiment.

(Overview of Control System According to First Embodiment)
FIG. 2 is a diagram illustrating an overview of the control system 1 including the device communication management unit 10. As illustrated in FIG. 2, the control system 1 includes a high-order controller 40 and one or more device communication management units 10 connected to the high-order controller 40 via a field network 50 (a high-order bus, that is, a high-order communication network). In the example illustrated in FIG. 2, device communication management units 10(A) and 10(B) are connected to the high-order controller 40 via the field network 50. In the following description, when it is not particularly necessary to distinguish the device communication management units 10(A) and 10(B) from each other, the device communication management units 10(A) and 10(B) are simply referred to as "the device communication management units 10."

The control system 1 is a master-slave control system that includes the high-order controller 40 serving as a master device and one or more device communication management units 10 serving as slave devices connected to the master device via a network (the field network 50). The high-order controller 40 is referred to as "a master device" meaning that data transmission via the field network 50 is managed. On the other hand, the device communication management unit 10 is referred to as "a slave device."

In the control system 1, one or more devices 20 are connected to the device communication management unit 10 via device communication cables 30. In the example illustrated in FIG. 2, devices 20(1), 20(2), 20(3), ..., 20(n) are connected to the device communication management unit 10 via the device communication cables 30. In the following description, when it is not particularly necessary to distinguish the devices 20(1), 20(2), 20(3), ..., 20(n) from each other, the devices 20(1), 20(2), 20(3), ..., 20(n) are simply referred to as "the devices 20."

The high-order controller 40 is, for example, a programmable logic controller (PLC) and is a master device that manages data transmission via the field network 50 in the control system 1. A slave device connected to the high-order controller 40 serving as a master device includes not only the device communication management unit 10 but also a servo driver (not illustrated) directly connected to the field network 50. Further, when a plurality of high-order controllers 40 are connected to the field network 50, any one of the high-order controllers 40 serves as a master device and the remaining high-order controllers 40 serve as slave devices in some cases. Furthermore, a control entity different from any of the high-order controller 40 and the device communication management unit 10 may serve as a master device. That is, "the master device" and "the slave device" are defined focusing on a data transmission control function on the field network 50 and information transmitted and received between the devices is not particularly limited.

The high-order controller 40 controls the whole control system 1. Specifically, the high-order controller 40 acquires, as input data, information from the device 20 which is an input device such as a sensor and executes an arithmetic process using the related acquired input data in accordance with a pre-embedded user program. Then, the high-order controller 40 executes the arithmetic process, determines control content on the device 20 which is an output device such as an actuator, and outputs control data corresponding to the control content to the device 20.

The field network 50 transmits various kinds of data which are received by the high-order controller 40 or transmitted by the high-order controller 40. The field network 50 is, for example, EtherCat (registered trademark), PROFINET (registered trademark), MECHATROLINK (registered trademark)-III, Powerlink, SERCOS (registered trademark)-III, or CIP Motion. The field network 50 may also be, for example, EtherNet/IP (registered trademark), DeviceNet, or CompoNete (registered trademark). Hereinafter, the control system 1 in which data is transmitted and received between the high-order controller 40 and the device communication management unit 10 or between the device communication management unit 10(A) and the device communication management unit 10(B) by sequentially transmitting data frames on the field network 50 will be described. In the following description, the field network 50 is referred to as a "high-order bus (high-order communication network)" to show contrast to communication via the device communication cable 30 which is a low-order communication network in some cases. Further, a data frame on the field network 50 is also referred to as "a high-order data frame" in order to distinguish the data frame from a data frame on the device communication cable 30.

As illustrated in FIG. 2, a support tool 60 is connected to the high-order controller 40 via a communication cable 70 which is, for example, a Universal Serial Bus (USB) cable.

The support tool 60 is an information processing device that sets various parameters in the control system 1. For example, a timing of acquisition (input refreshing) of a state value and a timing of updating (output refreshing) of an output value may be calculated or set by the support tool 60. The support tool 60 is generally configured as a general-purpose computer. For example, an information processing program executed by the support tool 60 may be stored in a compact disk read-only memory (CD-ROM) (not illustrated) for distribution. The program stored in the CD-ROM is read by a CD-ROM driving device (not illustrated) to be stored in a hard disk or the like of the support tool 60. Alternatively, the program may be downloaded to a high-order host computer or the like via a network.

The support tool 60 in the control system 1 receives a user operation and transmits the following instruction to the device communication management unit 10. That is, the support tool 60 transmits "settings instruction" for giving an instruction to store "identification information of the device 20 (identification information of an actual device) acquired from the device 20 (the actual device) actually connected to a device communication port 110" as "identification information of the device 20 scheduled to be connected to the device communication port 110 (registered device)" in a configuration settings information table 141. The device communication management unit 10 receiving the settings instruction from the support tool 60 generates configuration settings information (configuration information) including the identification information of the device 20 which is a registered device on the basis of the identification information of the actual device.

"The device 20 (registered device) scheduled to be connected to the device communication port 110 (in other words, intended to be connected to the device communication port 110)" is the device 20 registered as a device which is connected to each of the device communication ports 110(1), 110(2), ..., 110(n). That is, the device 20 (registered device) connected to each of the device communication ports 110(1), 110(2), ..., 110(n) is registered in advance as, for example, configuration information (disposition data). "The device 20 (the registered device) scheduled to be connected" is the device 20 determined in advance as a device connected to the device communication port 110 and is the device 20 registered as a device connected to the device communication port 110 in the device communication management unit 10. For example, the identification information of "the device 20 (the registered device) scheduled to be connected" is stored (registered) as the configuration information (the disposition data) in the configuration settings information table 141 in regard to each of the device communication ports 110(1), 110(2), ..., 110(n).

Here, instead of the support tool 60, the high-order controller 40 may transmit "the settings instruction" for instructing the device communication management unit 10 to store "the identification information of the device 20

(identification information of an actual device) acquired from the device 20 (the actual device) actually connected to the device communication port 110" as "the identification information of the device 20 (the registered device) scheduled to be connected to the device communication port 110 " in the configuration settings information table 141.

Even when the device communication management unit 10 does not receive "the settings instruction," the device communication management unit 10 may store "the identification information of the device 20 (the identification information of the actual device) acquired from the device 20 (the actual device) actually connected to the device communication port 110" as "the identification information of the device 20 (the registered device) scheduled to be connected to the device communication port 110" in the configuration settings information table 141. For example, the device communication management unit 10 may store "the identification information of the device 20 (the identification information of the actual device) acquired from the device 20 (the actual device) actually connected to the device communication port 110" as "the identification information of the device 20 (the registered device) scheduled to be connected to the device communication port 110" in the configuration settings information table 141 at each predetermined timing. That is, when a condition determined in advance is satisfied, the device communication management unit 10 may store "the identification information of the device 20 (the identification information of the actual device) acquired from the device 20 (the actual device) actually connected to the device communication port 110" as "the identification information of the device 20 (the registered device) scheduled to be connected to the device communication port 110" in the configuration settings information table 141.

Instead of the support tool 60, a human machine interface (HMI) may be connected to the high-order controller 40 via the communication cable 70. The human machine interface (HMI) is means for exchanging information between a human being and a machine and is specifically means used for a human being to operate a machine (give an instruction to a machine) or for a machine to inform a human being of a current state result. Regarding the HMI, the means used for a human being to give an instruction to a machine includes, for example, a switch, a button, a handle, a dial, a pedal, a remote controller, a microphone, a keyboard, and a mouse. The means used for a machine to deliver information regarding a current state result or the like to a human being includes, for example, a liquid crystal screen, a meter, a lamp, and a speaker.

The device communication management unit 10 is a slave device connected to the high-order controller 40 serving as a master device via a network (the field network 50) in the control system 1 which is a master-slave control system.

That is, the device communication management unit 10 controls communication between the high-order controller 40 (the field network 50) and the device 20. For example, the device communication management unit 10 transmits sensing information detected by the device 20 which is an input device such as a sensor connected to the device communication management unit 10 to the high-order controller 40 via the field network 50. Then, the high-order controller 40 executes a user program on the basis of the acquired sensing information and transmits the execution result as a control command signal to the device communication management unit 10 via the field network 50. The device communication management unit 10 outputs the control command signal received via the field network 50 to an output device (the device 20 such as an actuator) to be operated.

The device communication management unit 10 includes a high-order communication port 120 to which a transmission cable for communicating with the high-order controller 40 via the field network 50 is connected. The device communication management unit 10 includes one or more device communication ports 110(1), 110(2), . . . , 110(n) to which the device communication cable 30 for communicating with each of one or more devices 20 is connected. In the following description, when it is not particularly necessary to distinguish the device communication ports 110(1), 110 (2), . . . , 110(n) from each other, the device communication ports 110(1), 110(2), . . . , 110(n) are simply referred to as "the device communication ports 110."

The device communication management unit 10 executes a process related to data transmission on the field network 50 and controls transmission and reception (input and output) of data to and from the device 20. The device communication management unit 10 can transmit and receive data greater than 1 bit to and from "each of the devices 20(1), 20(2), . . . , 20(n) connected to each of the device communication ports 110(1), 110(2), . . . , 110(n)."

The device communication management unit 10 can transmit and receive (input and output) analog data in addition to binary data (1-bit data) like detection (ON) or non-detection (OFF) of any target by the device 20 which is, for example, a sensor. The analog data which can be transmitted and received between the device communication management unit 10 and the device 20 is, for example, a communication property, a device parameter, and identification data (identification information) of the device 20. That is, the device communication management unit 10 can transmit and receive data greater than 1 bit ((A) binary data (1-bit data) such as ON/OFF information and (B) other data including data related to the communication property, the device parameter, and the identification information of the device 20) to and from the device 20.

The device communication management unit 10 can also transmit and receive only binary data such as ON/OFF information to and from the device 20. In the following description, two types of communication executed between the device communication management unit 10 and the device 20 are distinguished from each other. That is, "communication for transmitting and receiving only binary data (1-bit data) such as ON/OFF information" between the device communication management unit 10 and the device 20 is referred to as communication of "a first mode" in some cases. In addition, "communication for transmitting and receiving data greater than 1 bit" between the device communication management unit 10 and the device 20 is referred to as communication of "a second mode" in some cases.

The device communication management unit 10 acquires the identification information (the identification information of the actual device) of each of the devices 20(1), 20(2), . . . , 20(n) by communicating with "each of the devices 20(1), 20(2), . . . , 20(n) (the actual device) actually connected to each of the device communication ports 110 (1), 110(2), . . . , 110(n)" in the second mode. The device communication management unit 10 also stores the identification information (the identification information of the registered device) of "each of the devices 20(1), 20(2), . . . , 20(n) (the registered device) scheduled to be connected to each of the device communication ports 110 (1), 110(2), . . . , 110(n)" in the storage unit 140 (in particular, the configuration settings information table 141).

The device communication management unit 10 has a collation function of determining whether the actually connected device 20 is a correct (scheduled) device 20 in regard to each of the device communication ports 110(1), 110(2), . . . , 110(n) by comparing the identification information of the actual device with the identification information of the registered device.

The device 20 is, for example, an input device such as a sensor or an output device such as an actuator. The actuator converts an input into a physical movement and is actively operated or driven.

In the following description, a device which can communicate with the device communication management unit 10 only in the first mode in which "only 1-bit data is transmitted and received" and a device which can communicate with the device communication management unit 10 in a second mode in which "data greater than 1 bit is transmitted and received" in the control system 1 are distinguished from each other. A device which can communicate with the device communication management unit 10 only in the first mode in which "only 1-bit data is transmitted and received" in the control system 1 is referred to as "a device 20(S)" in some cases. A device which can communicate with the device communication management unit 10 in the second mode in which "data greater than 1 bit is transmitted and received" in the control system 1 is referred to as "a device 20(C)" in some cases. The device 20(S) is a general (standard) device of the related art and transmits and receives only binary data such as ON/OFF information. The device 20(C) is an intelligent device (specifically, a device which can communicate with the device communication management unit 10). The device 20(C) transmits and receives data greater than 1 bit ((A) binary data (1-bit data) such as ON/OFF information and (B) other data including data related to the communication property, the device parameter, and the identification information of the device 20).

Since analog data such as identification information of the device 20(S) may not be acquired from the device 20(S) in regard to the device communication port 110 to which the device 20(S) is connected, the device communication management unit 10 does not execute a collation process to be described below. That is, the device communication management unit 10 does not execute the collation process in regard to the device communication port 110 communicating with the device 20 in the first mode.

The device 20 (in particular, the device 20(C)) retains identification information such as "a vendor name" and "a type name (device name)" of the device 20. The identification information can be acquired by the device communication management unit 10 by executing communication in the second mode between the device communication management unit 10 and the device 20 (in particular, the device 20(C)). That is, "each of the devices 20(1), 20(2), . . . , 20(n) (the actual device) actually connected to each of the device communication ports 110(1), 110(2), . . . , 110(n)" transmits each piece of identification information to the device communication management unit 10 when the device communication management unit 10 requests the device to transmit each piece of identification information.

(Device Communication Management Unit)

The overview of the control system 1 and the devices (the device communication management unit 10, the device 20, the high-order controller 40, and the support tool 60) included in the control system 1 has been described above with reference to FIG. 2. Next, content of a configuration and a process of the device communication management unit 10 included in the control system 1 will be described with reference to FIG. 1 and the like. Before the details of the device communication management unit 10 are described with reference to FIG. 1, an overview of the device communication management unit 10 will be summarized as follows to facilitate understanding of the device communication management unit 10.

(Overview of Device Communication Management Unit)

Figure 1:
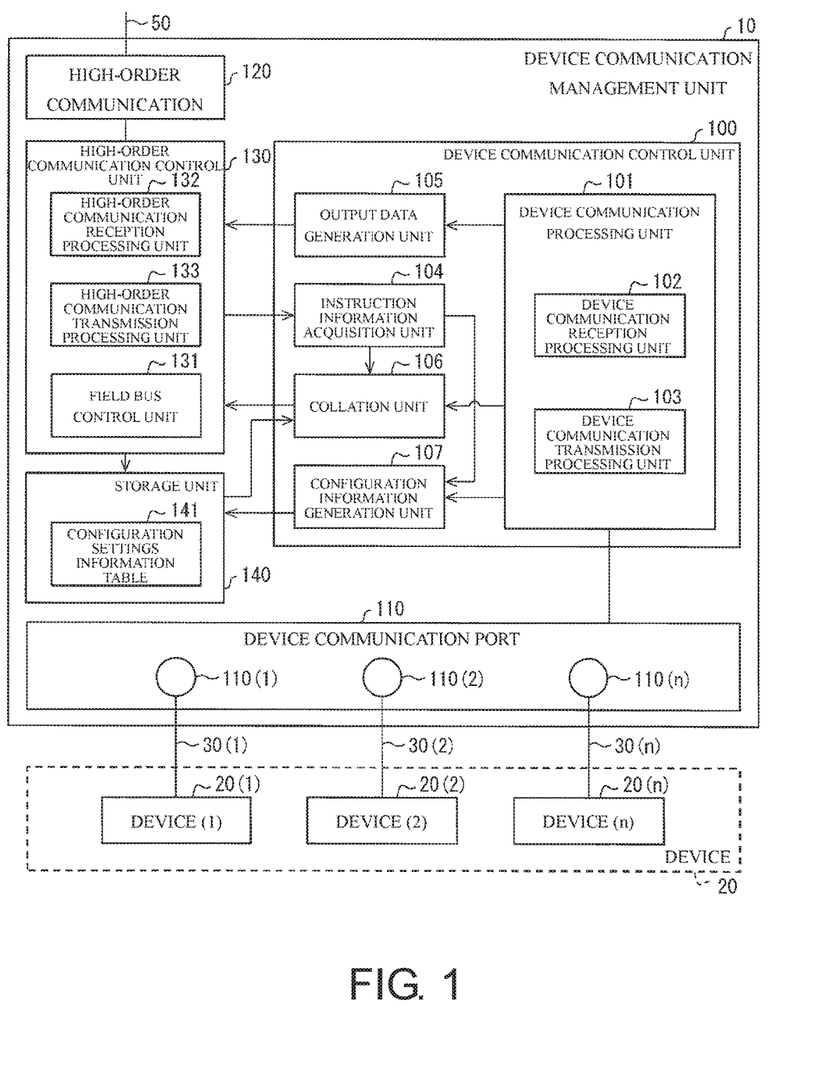
FIG. 1 is a block diagram illustrating a main unit configuration of a device communication management unit according to a first embodiment of the present invention.

The device communication management unit 10 is a slave device that is connected to the high-order controller 40 (a controller) which is a master device via the field network 50 (a network) and includes the device communication port 110 (a communication port) connected to the device 20. The device communication management unit 10 includes a device communication reception processing unit 102 (an acquisition unit) that acquires the identification information of the device 20 from the device 20 (the actual device) connected to the device communication port 110 and a configuration information generation unit 107 (a generation unit) that generates configuration settings information including identification information of the device 20 scheduled to be connected to the device communication port 110 (the device 20 determined in advance as the device connected to the device communication port 110 and is the device 20 (the registered device) registered as the device connected to the device communication port 110 in the device communication management unit 10) on the basis of the identification information (the identification information of the actual device) acquired by the device communication reception processing unit 102.

In the foregoing configuration, the configuration information generation unit 107 generates configuration settings information including the identification information of the device 20 (the registered device) scheduled to be connected to the device communication port 110 on the basis of the identification information which the device communication reception processing unit 102 acquires from the device 20 (the actual device) connected to the device communication port 110.

Accordingly, the device communication management unit 10 has the advantageous effect that the configuration settings information can be generated without acquiring the identification information of the device 20 (the registered device) scheduled to be connected to the device communication port 110 from a device other than the device 20. That is the device communication management unit 10 has the advantageous effect that it is not necessary for a user to manually input the identification information of the device 20 (the registered device) scheduled to be connected to the device communication management unit 10.

The device communication management unit 10 further includes an instruction information acquisition unit 104 that receives a settings instruction which is an instruction for generating the configuration settings information from the outside (for example, at least one of the support tool 60 and the high-order controller 40). When the instruction information acquisition unit 104 receives the settings instruction, the configuration information generation unit 107 generates configuration settings information including the identification information of the device 20 (the registered device) scheduled to be connected to the device communication port 110 on the basis of the identification information acquired by the device communication reception processing unit 102.

In the foregoing configuration, when the instruction information acquisition unit 104 receives the settings instruction which is an instruction for generating the configuration settings information from the outside, the configuration information generation unit 107 generates configuration settings information including the identification information of the device 20 (the registered device) scheduled to be connected to the device communication port 110 on the basis of the identification information which the device communication reception processing unit 102 acquires from the device 20 (the actual device) connected to the device communication port 110.

Accordingly, the device communication management unit 10 has the advantageous effect that the configuration settings information can be generated on the basis of the identification information acquired from the device 20 when the settings instruction is received. That is, the slave device has the advantageous effect that it is not necessary for a user to manually input and register the identification information of the device scheduled to be connected to the slave device.

The device communication management unit 10 further includes a device communication transmission processing unit 103 (an identification information request unit) that requests the device 20 (the actual device) connected to the device communication port 110 to transmit the identification information of the device 20 (the identification information of the actual device). The device communication reception processing unit 102 acquires the identification information of the device 20 (the identification information of the actual device) from the device 20 requested to transmit the identification information by the device communication transmission processing unit 103.

In the foregoing configuration, the device communication reception processing unit 102 acquires the identification information of the device 20 (the identification information of the actual device) from the device 20 requested to transmit the identification information by the device communication transmission processing unit 103.

Accordingly, the device communication management unit 10 has the advantageous effect that the identification information of the device 20 (the identification information of the actual device) can be acquired from the device 20 receiving the request to transmit the identification information from the device communication transmission processing unit 103 and the configuration settings information including the identification information of the device 20 (the registered device) scheduled to be connected to the device communication port 110 can be generated based on the acquired identification information.

The device communication management unit 10 further includes a collation unit 106 that collates the identification information (the identification information of the actual device) acquired by the device communication reception processing unit 102 with the identification information (the identification information of the registered device) included in the configuration settings information. The configuration information generation unit 107 generates the configuration settings information in a state in which an instruction is given from the outside so that the collation unit 106 does not collate the identification information acquired by the device communication reception processing unit 102 with the identification information included in the configuration settings information.

In the foregoing configuration, the configuration information generation unit 107 generates the configuration settings information in a state in which an instruction is given so that the collation unit 106 does not collate the identification information (the identification information of the actual device) acquired by the device communication reception processing unit 102 with the identification information (the identification information of the registered device) included in the configuration settings information.

Accordingly, the device communication management unit 10 has the advantageous effect that it is possible to avoid a situation in which the configuration settings information is updated using the identification information (the identification information of the actual device) acquired by the device communication reception processing unit 102 even when it is necessary for the collation unit 106 to execute the collation.

(Details of Device Communication Management Unit)

The details of the configuration of the device communication management unit 10 in the above-described overview of the device communication management unit 10 will be described with reference to FIG. 1.

FIG. 1 is a block diagram illustrating a main unit configuration of the device communication management unit 10 included in the control system 1. The device communication management unit 10 illustrated in FIG. 1 includes a device communication control unit 100, the device communication port 110, the high-order communication port 120, a high-order communication control unit 130, and a storage unit 140. To simplify the description, a configuration directly unrelated to the embodiment will be omitted in the description and the block diagram. Here, the device communication management unit 10 may have the omitted configuration on the basis of actual circumstances of implementation.

The device communication port 110 is an interface to which a transmission cable for communicating with the device 20 via the device communication cable 30 is connected. The high-order communication port 120 is an interface to which a transmission cable for communicating with the high-order controller 40 via the field network 50 is connected.

The high-order communication control unit 130 generally controls communication with the high-order controller 40 via the field network 50. The high-order communication control unit 130 includes a field bus control unit 131, a high-order communication reception processing unit 132, and a high-order communication transmission processing unit 133.

The field bus control unit 131 manages data transmission via the field network 50. The high-order communication reception processing unit 132 receives a high-order communication frame transmitted from the high-order controller 40 via the field network 50, decodes the high-order communication frame into data, and then outputs the data to the field bus control unit 131. The high-order communication transmission processing unit 133 regenerates the high-order communication frame from the data output from the field bus control unit 131 and retransmits (forwards) the high-order communication frame via the field network 50. The field bus control unit 131 transmits and receives data to and from the high-order controller 40 for each control period determined in advance via the field network 50 in cooperation with the high-order communication reception processing unit 132 and the high-order communication transmission processing unit 133.

The high-order communication control unit 130 transmits an IO map indicating how the device 20 (for example, data corresponding to data output from the device 20) is allocated in a memory space and an I/O space, to the high-order controller 40 (the field network 50).

The high-order communication control unit 130 receives the settings instruction from the support tool 60 via the field network 50 (the high-order controller 40). That is, the high-order communication control unit 130 receives the following information from the support tool 60. That is, the high-order communication control unit 130 receives "a setting instruction" to store "the identification information of the device 20 (the identification information of the actual device) acquired from the device 20 (the actual device) actually connected to the device communication port 110" as "the identification information of the device 20 (the registered device) scheduled to be connected to the device communication port 110" in the configuration settings information table 141. The high-order communication control unit 130 notifies the instruction information acquisition unit 104 of the received settings information.

The device communication control unit 100 generally controls a function of the device communication management unit 10 related to communication with the device 20. The illustrated device communication control unit 100 includes a device communication processing unit 101, the device communication reception processing unit 102, the device communication transmission processing unit 103, the instruction information acquisition unit 104, an output data generation unit 105, the collation unit 106, and a configuration information generation unit 107 as functional blocks.

The device communication processing unit 101 controls communication with the device 20 and includes the device communication reception processing unit 102 and the device communication transmission processing unit 103. The device communication processing unit 101 controls whether each of the device communication ports 110(1), 110(2), . . . , 110(n) communicates with each of the connected devices 20(1), 20(2), . . . , 20(n) in the first mode or the second mode.

The device communication processing unit 101 acquires a collation result (collation normality/collation abnormality) in each of the device communication ports 110(1), 110(2), . . . , 110(n) from the collation unit 106. The device communication processing unit 101 executes the following process when a collocation result that "the device 20 (the registered device) scheduled to be connected matches the actually connected device 20 (the actual device) (the collation normality)" in regard to a certain device communication port 110 is acquired from the collation unit 106. That is, when the collation result of the collation normality is acquired, the device communication processing unit 101 maintains the communication in the certain device communication port 110. The device communication processing unit 101 executes the following process when a collocation result that "the device 20 (the registered device) scheduled to be connected does not match the actually connected device 20 (the actual device) (the collation abnormality)" in regard to a certain device communication port 110 is acquired from the collation unit 106. That is, when the collation result of the collation abnormality is acquired, the device communication processing unit 101 stops the communication in the certain device communication port 110. When the collation process is not executed in a certain device communication port 110 by the collation unit 106, the device communication processing unit 101 maintains the communication in the certain device communication port 110.

The device communication reception processing unit 102 receives the following data from each of the device communication ports 110(1), 110(2), . . . , 110(n) via the device communication cable 30. That is, the device communication reception processing unit 102 receives data output by the devices 20(1), 20(2), . . . , 20(n) respectively connected to the device communication ports 110(1), 110(2), . . . , 110(n).

The data output by the device 20 includes the following data in addition to 1-bit data (for example, binary data such as ON/OFF information like detection (ON) or non-detection (OFF) of any target by the device 20 which is a sensor). That is, the data includes analog data related to a communication property, a device parameter, and identification data (identification information) of the device 20. The device communication reception processing unit 102 receives the 1-bit data and the analog data from the device 20. In particular, the device communication reception processing unit 102 receives the identification information of each of the devices 20(1), 20(2), . . . , 20(n) (the actual devices) from "each of the devices 20(1), 20(2), . . . , 20(n) (the actual devices) actually connected to each of the device communication ports 110(1), 110(2), . . . , 110(n)" communicating in the second mode.

The device communication transmission processing unit 103 transmits the following data from each of the device communication ports 110(1), 110(2), . . . , 110(n) via the device communication cable 30. That is, the device communication transmission processing unit 103 transmits input data such as a control command from the high-order controller 40 to the devices 20(1), 20(2), . . . , 20(n) respectively connected to the device communication ports 110(1), 110(2), . . . , 110(n).

The data transmitted to the device 20 by the device communication transmission processing unit 103 includes analog data related to other control or the like on the device 20 in addition to 1-bit data (for example, instruction data for activating (turning ON) or deactivating (turning OFF) the device 20 which is an actuator).

In particular, the device communication transmission processing unit 103 transmits a signal for a request to transmit each piece of identification information to "each of the devices 20(1), 20(2), . . . , 20(n) (the actual devices) actually connected to each of the device communication ports 110 (1), 110(2), . . . , 110(n)" communicating in the second mode. "Each of the devices 20(1), 20(2), . . . , 20(n) (the actual devices)" receiving "the signal for the request to transmit each piece of identification information" from the device communication transmission processing unit 103 transmits each piece of identification information to the device communication management unit 10.

Here, the device communication transmission processing unit 103 transmits the signal requesting each piece of identification information to "each of the devices 20(1), 20(2), . . . , 20(n) (the actual devices) actually connected to each of the device communication ports 110(1), 110(2), . . . , 110(n)" at, for example, the following timing. That is, the device communication transmission processing unit 103 transmits the signal requesting each piece of identification information at a timing at which the device communication transmission processing unit 103 establishes communication with the devices 20(1), 20(2), . . . , 20(n) (the actual devices).

When the high-order communication control unit 130 notifies the instruction information acquisition unit 104 of the reception of the settings instruction, the instruction information acquisition unit 104 instructs the collation unit 106 to pause (stop) the collation process and instructs the configuration information generation unit 107 to execute the following process. That is, the instruction information acquisition unit 104 instructs the configuration information generation unit 107 to generate configuration settings information including the identification information of the device 20 (the registered device) scheduled to be connected to the device communication port 110 on the basis of the identification information of the device 20 (the actual device) connected to the device communication port 110.

The output data generation unit 105 stores the data output by the devices 20(1), 20(2), . . . , 20(n) at predetermined positions with a predetermined data format and generates data which is transmitted to the high-order controller 40 (the field network 50).

The collation unit 106 can execute the following process on each of the device communication ports 110(1), 110(2), ..., 110(n). That is, the collation unit 106 can execute a collation process of determining whether the device 20 (the registered device) scheduled to be connected to each of the device communication ports 110(1), 110(2), ..., 110(n) matches the actually connected device 20 (the actual device).

For example, the collation unit 106 acquires the following information in regard to each of the device communication ports 110(1), 110(2), ..., 110(n) with reference to the configuration setting information table 141 stored in the storage unit 140. That is, the collation unit 106 acquires the identification information of the device 20 (the registered device) scheduled to be connected to each of the device communication polls 110(1), 110(2), ..., 110(n).

The collation unit 106 also acquires the identification information of the device 20 (the actual device) actually connected to each of the device communication ports 110 (1), 110(2), ..., 110(n) from the device communication reception processing unit 102. As described, the device communication reception processing unit 102 can receive the analog data including the identification information of the device 20 from the device 20.

Then, the collation unit 106 executes a collation process of determining whether the identification information of the device 20 (the registered device) scheduled to be connected matches the identification information of the actually connected device 20 (the actual device) in regard to each of the device communication ports 110(1), 110(2), ..., 110(n).

The collation unit 106 executes any of the following two types of determination between the registered device and the actual device for each device communication port 110. That is, the collation unit 106 determines whether "a vendor ID, a device ID, and a revision" are matched between the registered device and the actual device for each device communication port 110 (first collation pattern). Alternatively, the collation unit 106 determines whether "a vendor ID, a device ID, a revision, and a serial No." are matched between the registered device and the actual device for each device communication port 110 (second collation pattern).

The collation unit 106 notifies the device communication processing unit 101 and the high-order communication control unit 130 of an execution result (collation normality/collation abnormality) of the collation process related to each of the device communication ports 110(1), 110(2), ..., 110(n). When the collation unit 106 determines the collation abnormality (that the identification information of the registered device does not match the identification information of the actual device), the collation unit 106 instructs the high-order communication control unit 130 to transmit the following information to the support tool 60. That is, when the collation unit 106 determines the collation abnormality, the collation unit 106 causes the high-order communication control unit 130 to transmit the identification information of the registered device to the support tool 60. The collation unit 106 may cause the high-order communication control unit 130 to transmit not only the identification information of the registered device for each device communication port 110 but also the identification information of the actual device to the support tool 60.

The collation unit 106 executes the collation process or does not execute the collation process on each of the device communication ports 110(1), 110(2), ..., 110(n). The collation unit 106 can selectively execute the collation process on each of the device communication ports 110(1), 110(2), ..., 110(n). In other words, the collation unit 106 can execute the collation process on the other device communication ports 110 without executing the collation process on a certain device communication port 110 among the device communication ports 110(1), 110(2), ..., 110(n). For example, the collation unit 106 executes the collation process on each of the device communication ports 110(1), 110(3), ..., 110(n) without executing the collation process on the device communication port 110(2).

When only the binary data like ON/OFF information is transmitted and received between a certain device communication port 110 and the device 20, the collation unit 106 does not execute the collation process on the certain device communication port 110. In other words, when a certain device communication port 110 communicates with the device 20 in the first mode, the collation unit 106 does not execute the collation process on the certain device communication port 110. That is, the collation unit 106 does not execute the collation process on the device communication port 110 to which the device 20(S) is connected.

When an instruction for generating the configuration settings information is received from the instruction information acquisition unit 104, the configuration information generation unit 107 generates the following information. That is, the configuration information generation unit 107 generates the configuration settings information including the identification information of the device 20 (the registered device) scheduled to be connected to the device communication port 110 on the basis of the identification information of the device 20 (the actual device) connected to the device communication port 110.

For example, the configuration information generation unit 107 acquires the identification information of each of the devices 20(1), 20(2), ..., 20(n) (the actual devices) actually connected to each of the device communication ports 110(1), 110(2), ..., 110(n) from the device communication reception processing unit 102. Then, the identification information of the actual device for each device communication port 110 is stored as the identification information of the registered device (the device 20 scheduled to be connected to each of the device communication ports 110(1), 110(2), ..., 110(n)) for each device communication port 110 in the configuration settings information table 141.

Here, as described above, in order for the configuration information generation unit 107 to generate the configuration settings information, it may not be necessary for the instruction information acquisition unit 104 to receive the settings instruction from at least one of the support tool 60 and the high-order controller 40 (via the high-order communication control unit 130). For example, the configuration information generation unit 107 may store "the identification information of the device 20 (the identification information of the actual device) acquired from the device 20 (the actual device) actually connected to the device communication port 110" as "the identification information of the device 20 (the registered device) scheduled to be connected to the device communication port 110" in the configuration settings information table 141 for each predetermined timing. That is, when a condition determined in advance is satisfied, the configuration information generation unit 107 may store "the identification information of the device 20 (the identification information of the actual device) acquired from the device 20 (the actual device) actually connected to the device communication port 110" as "the identification information of the device 20 (the registered device) scheduled to be connected to the device communication port 110" in the configuration settings information table 141.

The storage unit 140 stores various kinds of data which are used by the device communication management unit 10. That is, the storage unit 140 stores (1) a control program that is executed by the device communication management unit 10, (2) an OS program, (3) an application program executing various functions, and (4) various kinds of data read when the application program is executed. The data of (1) to (4) is stored in, for example, a nonvolatile storage device such as a read-only memory (ROM), a flash memory, an erasable programmable ROM (EPROM), an electrically EPROM (EEPROM) (registered trademark), a hard disk drive (HDD). The storage unit 140 stores the configuration settings information table 141.

The configuration settings information table 141 stores the configuration settings information (disposition data) including the identification information of the device 20 (the registered device) scheduled to be connected via the device communication cable 30 in regard to each of the device communication ports 110(1), 110(2), . . . , 110(*n*). The identification information of the device 20 is, for example, "a vendor ID," "a device ID," "a serial No.," "a revision (for example, an IO-Link (registered trademark) revision)" "a vendor name," and "a type name (device name)" of the device 20.

Of the identification information of the device 20 stored in the configuration settings information table 141, the identification information to be subjected to the collation process by the collation unit 106 is "the vendor ID," "the device ID," "the revision (for example, an IO-Link revision)", and "the serial No." at most. Of the identification information of the device 20, "the vendor name" and "the type name (device name)" are not pieces of the identification information to be subjected to the collation process by the collation unit 106.

(Device Collation Process)

When the device 20 is connected to the device communication port 110 via the device communication cable 30, the collation unit 106 executes the collation process. The collation unit 106 determines the collation abnormality when the device 20 (the actual device) actually connected to the device communication port 110 does not match the device 20 (the registered device) scheduled to be connected to the device communication port 110. Then, when the collation unit 106 determines "the collation abnormality," the device communication processing unit 101 stops the communication in the device communication port 110.

Here, the collation unit 106 collates "the vendor ID," "the device ID," and "the revision" between the device 20 (the actual device) actually connected to the device communication port 110 and the device 20 (the registered device) scheduled to be connected to the device communication port 110 (a first collation pattern).

The collation unit 106 may collate "the vendor ID," "the device ID," "the revision", and "the serial No." between the device 20 (the actual device) actually connected to the device communication port 110 and the device 20 (the registered device) scheduled to be connected to the device communication port 110 (a second collation pattern).

Here, as described above, the collation unit 106 executes the collation process on each of the device communication ports 110(1), 110(2), . . . , 110(*n*). For example, the collation unit 106 collates "the vendor ID," "the device ID," and "the revision" between the device 20 (the actual device) actually connected to the device communication port 110(1) and the device 20 (the registered device) scheduled to be connected to the device communication port 110(1). The collation unit 106 collates "the vendor ID," "the device ID," and "the revision" between the device 20 (the actual device) actually connected to the device communication port 110(2) and the device 20 (the registered device) scheduled to be connected to the device communication port 110(2). The collation unit 106 can selectively execute the collation process on each of the device communication ports 110(1), 110(2), . . . , 110(*n*). For example, the collation unit 106 can execute the collation process on the device communication ports 110(1), 110(3), 110(4), . . . , 110(*n*) without executing the collation process on the device communication port 110(2).

When the collation unit 106 executes the collation process in the first collation pattern, the collation unit 106 does not set "the serial No." as a collation target. Accordingly, the collation unit 106 does not determine the collation abnormality even when the device 20 of the same type as the registered device (that is, the device 20 of which "the vendor ID," "the device ID," and "the revision" are the same as those of the registered device) is connected to the device communication port 110.

(Registration of Configuration Settings Information in Device Communication Management Unit of the Related Art)

To facilitate understanding of the device communication management unit 10, a device communication management unit 9 of the related art executing a collation process on the connected device 20 as in the device communication management unit 10 will be described with reference to FIG. 4. The device communication management unit 9 of the related art is the same as the device communication management unit 10 except that the configuration information generation unit 107 in the device communication management unit 10 is not included. Accordingly, the details of the configuration of the device communication management unit 9 of the related art will be described in brief focusing on differences from the device communication management unit 10.

The differences between the device communication management unit 10 and the device communication management unit 9 of the related art are clear in a method of generating the configuration settings information table 141 (a method of registering the configuration settings information).

Figure 4:
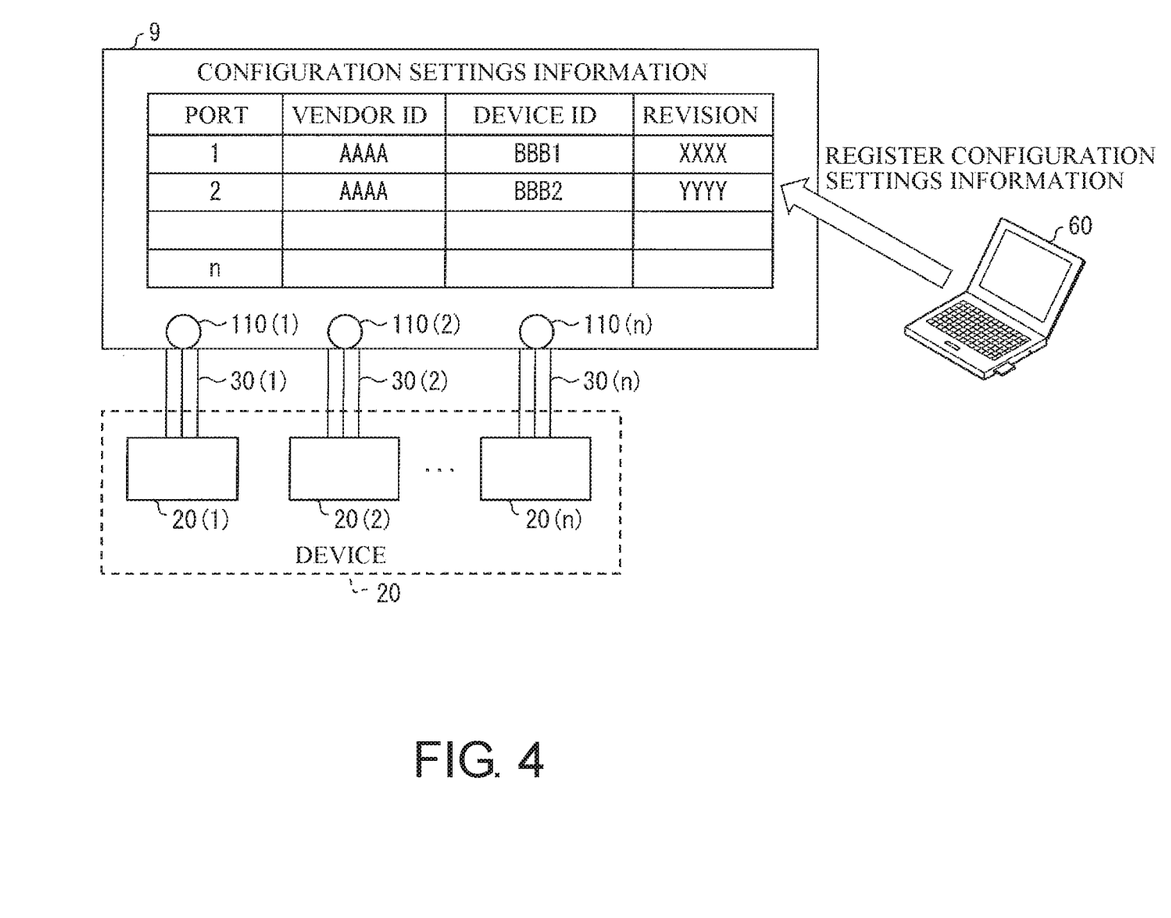
FIG. 4 is an explanatory diagram illustrating a method of registering identification information of a device to be connected in the device communication management unit of the related art.

FIG. 4 is an explanatory diagram illustrating a method of registering the identification information (the configuration settings information) of the device 20 to be connected in the device communication management unit 9 of the related art.

The device communication management unit 9 of the related art executes a collation process of confirming that the device 20 actually connected to a certain device communication port 110 is the intended device 20 (the device 20 scheduled to be connected to the certain device communication port 110).

In order for the device communication management unit 9 of the related art to execute the collation process, it is necessary for the user to in advance register the identification information of the device 20 scheduled to be connected to a certain device communication port 110 of the device communication management unit 9 of the related art using the support tool 60. That is, the user first manually inputs the identification information of the device 20 scheduled to be connected to the device communication port 110 to the support tool 60. Then, the support tool 60 transmits the identification information of the device 20 manually input by the user for each device communication port 110 to the device communication management unit 9 of the related art. The device communication management unit 9 of the related art stores "the identification information of the device 20 manually input by the user for each device communication port 110" from the support tool 60 in the configuration settings information table 141.

That is, in order for the device communication management unit 9 of the related art to execute the collation process, the support tool 60 is necessary and it is necessary for the user to manually input the identification information of the device 20 scheduled to be connected to the support tool 60 for each device communication port 110. Of the identification information of the device 20 manually input by the user, in particular, the user visually confirms the serial No. of the device 20 directly and manually inputs the serial No. in the support tool 60, and thus it takes some time to execute the work and there is a possibility of an input mistake occurring.

(Registration of Configuration Settings Information in Device Communication Management Unit According to Embodiment of the Present Invention)

Figure 3:
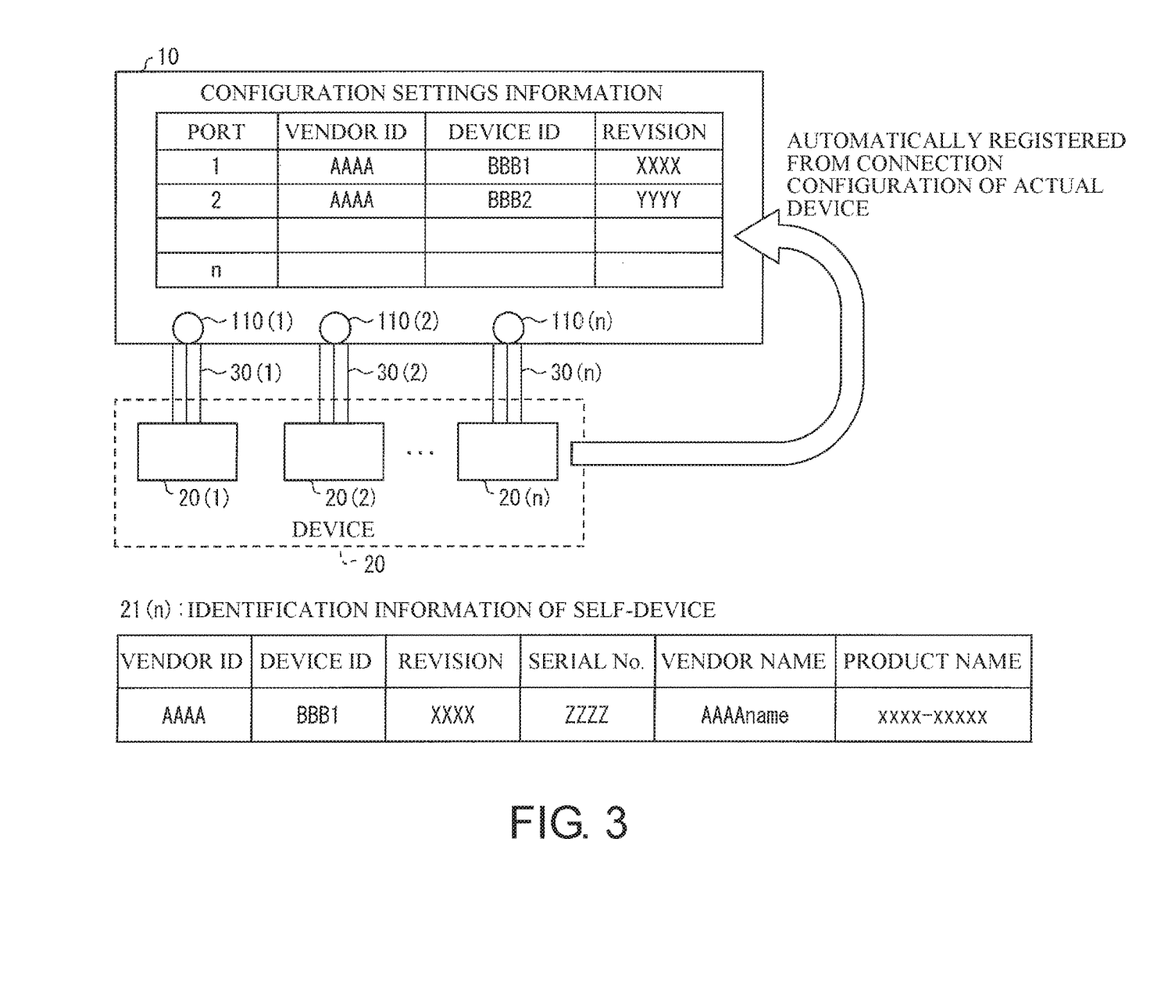
FIG. 3 is an explanatory diagram illustrating a method of registering identification information of a device to be connected in the device communication management unit in FIG. 1.

FIG. 3 is an explanatory diagram illustrating a method of registering the identification information (the configuration settings information) of the device 20 to be connected in the device communication management unit 10. A control method initially executed in the device communication management unit 10 will be summarized as follows.

That is, the control method executed in the device communication management unit 10 is a control method of the device communication management unit 10 (a slave device) that is connected to the high-order controller 40 (a controller) which is a master device via the field network 50 (a network) and includes the device communication port 110 (a communication port) to which the device 20 is connected. The control method includes an acquisition step of acquiring the identification information of the device 20 (the actual device) connected to the device communication port 110 from the device 20; and a generation step of generating the configuration settings information including the identification information of the device 20 (the registered device) scheduled to be connected to the device communication port 110 on the basis of the identification information (the identification information of the actual device) acquired in the acquisition step.

According to the foregoing method, in the generation step, the configuration settings information including the identification information (the identification information of the registered device) of the device 20 (the registered device) scheduled to be connected to the device communication port 110 is generated on the basis of the identification information (the identification information of the actual device) acquired in the acquisition step from the device 20 (the actual device) connected to the device communication port 110.

Accordingly, the control method executed in the device communication management unit 10 has the advantageous effect the configuration settings information can be generated without acquiring the identification information of the device 20 (the identification information of the registered device) scheduled to be connected to the device communication port 110 from a device other than the device 20. That is, the control method executed in the device communication management unit 10 has the advantageous effect that it is not necessary for a user to manually input and register the identification information of the device 20 (the registered device) scheduled to be connected to the device communication management unit 10.

That is, the device communication management unit 10 can considerably reduce the number of steps of generating the input data of the configuration settings information table 141 referred to at the time of executing the collation process, compared to the device communication management unit 9 of the related art exemplified in FIG. 4.

The device communication management unit 10 generates the configuration settings information including the identification information (the identification information of the registered device) of the device 20 (the registered device) scheduled to be connected to the device communication port 110 on the basis of the identification information (the identification information of the actual device) acquired from the device 20 (the actual device) actually connected to the device communication port 110. That is, the device communication management unit 10 generates the configuration settings information including the identification information of the registered device without acquiring the identification information (the identification information of the registered device) of the device 20 scheduled to be connected to the device communication port 110 from the device (specifically, the support tool 60) other than the device 20.

For example, the device communication management unit 10 copies the identification information (the identification information of the actual device) acquired from the device 20 (the actual device) actually connected to the device communication port 110 and generates the configuration settings information including the identification information (the identification information of the registered device) of the device 20 (the registered device) scheduled to be connected to the device communication port 110. In other words, the device communication management unit 10 generates the configuration settings information including the identification information of the registered device directly from the identification information of the actual device (that is, without involving the support tool 60).

The device communication management unit 10 generates "the identification information which is stored in the configuration settings information table 141 and is the identification information of each of the devices 20(1), 20(2), . . . , 20(n) scheduled to be connected to each of the device communication ports 110(1), 110(2), . . . , 110(n)" from "the identification information of the device 20 actually connected to each of the device communication ports 110(1), 110(2), . . . , 110(n)." That is, the device communication management unit 10 can generate input data of the configuration settings information table 141 referred to at the time of executing the collation process or the like without using the support tool 60.

The device communication management unit 10 can also acquire the following information in addition to the identification information (the vendor ID, the device ID, the revision, and the serial No.) of "each of the devices 20(1), 20(2), . . . , 20(n) (the actual devices) actually connected to each of the device communication ports 110(1), 110(2), . . . , 110(n)." That is, the device communication management unit 10 can acquire the IO size of each of the devices 20(1), 20(2), . . . , 20(n) from each of the devices 20(1), 20(2), . . . , 20(n). That is, the device communication management unit 10 can acquire the identification information and the IO size of the actual device (the device 20 actually connected to the device communication port 110) from the actual device.

Then, the device communication management unit 10 stores the acquired identification and IO size of the actual device (the device 20 actually connected to the device communication port 110) in the configuration settings information table 141.

That is, the device communication reception processing unit 102 further acquires information related to a transmission size of data defined for each device 20 from the device 20 (the actual device) connected to the device communication port 110. Then, the configuration information generation unit 107 generates the configuration settings information further including the information regarding the transmission size of the data defined for each device 20 acquired by the device communication reception processing unit 102.

In the foregoing configuration, the device communication management unit 10 generates the configuration settings information including the information regarding the transmission size of the data defined for each device 20.

Accordingly, for example, the device communication management unit 10 has the advantageous effect that transmission to the field network 50 can be efficient by determining a period, a speed, or the like at which the data acquired from the device 20 is transmitted to the field network 50 using the information regarding to the transmission size of the data defined for each device 20.

(Registration Example of Configuration Settings Information)

Here, the device communication management unit 10 generates the configuration settings information from "the identification information of the device 20 actually connected to each of the device communication ports 110(1), 110(2), . . . , 110(n)," for example, in the following order.

First, the device communication processing unit 101 confirms whether the collation unit 106 executes the collation process on all the device communication ports 110(1), 110(2), . . . , 110(n). When the device communication processing unit 101 confirms that the collation unit 106 is not executing the collation process, the device communication processing unit 101 sets any device 20 to be connectable to all the device communication ports 110(1), 110(2), . . . , 110(n).

Subsequently, when each of the devices 20(1), 20(2), . . . , 20(n) is connected to each of the device communication ports 110(1), 110(2), . . . , 110(n), the device communication processing unit 101 reads the following information. That is, the device communication processing unit 101 reads the identification information of each of the devices 20(1), 20(2), . . . , 20(n) connected to each of the device communication ports 110(1), 110(2), . . . , 110(n).

Then, when the high-order communication control unit 130 receives a registration instruction message from the support tool 60 (or HMI) or the high-order controller 40 via the field network 50, the configuration infolination generation unit 107 executes a process. That is, the configuration information generation unit 107 stores "the identification information of each of the devices 20(1), 20(2), . . . , 20(n) connected to each of the device communication ports 110 (1), 110(2), . . . , 110(n)" read by the device communication processing unit 101 as the configuration settings information in the configuration settings information table 141.

(IO-Link)

In the control system 1, the device communication management unit 10 and the device 20 may communicate with each other by IO-Link (registered trademark). An overview of IO-Link will be described below.

IO-Link is standardized with a name "Single-drop digital communication interface for small sensors and actuators" (SDCI) in IEC 61131-9. IO-Link is a standard technology for communication between a master (PLC) (for example, the high-order controller 40 in the control system 1) which is a control device and devices (for example, the devices 20 in the control system 1) such as a sensor and an actuator. IO-Link is a new point-to-point serial communication protocol used for communication between a master (PLC) and devices such as a sensor and an actuator.

In a protocol of the related art (for example, a communication protocol of the first mode in the control system 1), only transmission of an ON/OFF signal (with 1 bit) from the device to the master (PLC) can be executed. IO-Link is a communication protocol (for example, a communication protocol of the second mode in the control system 1) in which transmission and reception (duplex communication) of data with 32 bytes (256 bits) can be executed unlike the protocol of the related art. By linking the master (PLC) to the devices such as a sensor and an actuator by IO-Link, signals from the devices which can be received with only binary data such as ON/OFF information in the related art can be acquired as numerical data with 32 bytes. Accordingly, for example, in the case of a photoelectric sensor, information such as an amount of received light, the degree of detection margin, and internal temperature can be acquired. Thus, not only is it helpful to investigate a cause of a fault, but it is also possible to diagnose a lifespan of a product and change a threshold in accordance with deterioration over time.

By using IO-Link, for example, it is possible to automate settings, maintenance, and the like of a device. By using IO-Link, it is possible to considerably simplify programming of the master (PLC). Further, it is possible to realize a reduction in cost of wiring cables or the like. Examples of the device include a photoelectric sensor and a proximity switch.

(IO-Link System)

An IO-Link system includes an IO-Link device (in general, a sensor, an actuator, or a combination thereof), a standard 3-wire sensor/actuator cable, and an IO-Link master (for example, the device communication management unit 10 in the control system 1).

Here, the IO-Link master includes one port or a plurality of ports, and one IO-Link device can be connected to each port. The IO-Link master executes a point-to-point communication with the IO-Link device. The IO-Link master can transmit and receive not only binary data (1-bit data) such as ON/OFF information of the related art but also the following information to and from the IO-Link device. That is, the IO-Link master can transmit and receive information (data greater than 1 bit) such as information regarding the identification information of a device, a communication property of a device, a device parameter, and process diagnosis data other the binary data such as ON/OFF information to and from the IO-Link device.

The IO-Link device is a device which can transmit and receive data greater than 1 bit (for example, the device 20(C) in the control system 1) to and from the IO-Link master.

(Two Communication Modes)

The IO-Link device can be operated without the IO-Link master in a digital exchange mode of the related art (for example, the first mode in the control system 1) called a standard IO (SIO). That is, the IO-Link device can be operated using a master which can receive only binary data such as ON/OFF information from a sensor. Similarly, the IO-Link master can operate a device of the related art (which is a device that can receive only binary data such as ON/OFF information from the IO-Link master and is, for example, the device 20(S) in the control system 1) using the SIO.

A port of the IO-Link retains configuration data. When a certain port is set in an SIO mode, the IO-Link master operates the port as in a port of the related art (a port which can transmit and receive only binary data such as ON/OFF information). When a certain port is set in a communication mode (COM mode) (for example, the second mode in the control system 1), the IO-Link master can transmit and receive data greater than 1 bit to and from a device connected to the port (the IO-Link device and, for example, the device 20(C) in the control system 1).

(Collation Function)

By using the IO-Link, it is possible to acquire information (data greater than 1 bit) other than ON/OFF data from devices (IO-Link devices) such as a sensor and an actuator. Specifically, it is possible to acquire identification information (a vendor ID, a device ID, a revision, and a serial No.) of the device.

The IO-Link master has a collation function of collating a device scheduled to be connected with a device actually connected to the port for each port. The IO-Link master executes the collation process at a timing at which IO-Link communication is established. For example, when an IO-Link device is connected to the port, the IO-Link master acquires the identification information of the device and the communication property of the device from the connected IO-Link device.

The IO-Link master in advance stores the configuration settings information included in the identification information of the device (the IO-Link device) scheduled to be connected for each port.

The IO-Link master acquires the identification information of the device (the IO-Link device) scheduled to be connected to the port with reference to the configuration settings information and determines whether the acquired identification information matches the identification information of the device (the IO-Link device) actually connected to the port.

For example, the IO-Link master determines whether "the vendor ID, the device ID, the IO-Link revision, the serial No." of the device scheduled to be connected match "the vendor ID, the device ID, the IO-Link revision, and the serial No." of the actually connected device for each port. When the IO-Link master determines that "the vendor ID, the device ID, the IO-Link revision, the serial No." of the device scheduled to be connected do not match "the vendor ID, the device ID, the IO-Link revision, and the serial No." of the actually connected device (collation abnormality), the IO-Link master stops the IO-Link communication.

For the identification information used when the IO-Link master executes the collation process, one of the following two patterns can be selected. In a first pattern, the IO-Link master can be caused to execute the collation process using the vendor ID, the device ID, and the IO-Link revision (a simple collation function). In a second pattern, the IO-Link master can be execute the collation process using the vendor ID, the device ID, the IO-Link revision, and the serial No. (a detailed collation function). Here, when the serial No. is not referred to at the time of the collation process, the IO-Link master determines the collation normality even when the serial No is not matched for the device of the same type as the registered device (the device which has the same vendor ID, device ID, and IO-Link revision as the registered device except for the serial No.). Then, it is possible to execute the IO-Link communication with the exchanged device.

[Realization Example by Software]

A control block (in particular, each of the high-order communication control unit 130 and the device communication control unit 100) of the device communication management unit 10 may be realized by a logic circuit (hardware) formed by an integrated circuit (IC chip) or may be realized by software using a central processing unit (CPU).

In the latter case, the device communication management unit 10 includes a CPU that executes a command of a program which is software realizing each function, a read-only memory (ROM) or a storage device (which is referred to as "a recording medium") on which the program and various kinds of data are recoded readably by a computer (or a CPU), and a random-access memory (RAM) that loads the program. When the computer (or the CPU) reads the program from the recording medium and executes the program, an object of the present invention is achieved. As the recording medium, "a non-transitory medium," for example, a tape, a disc, a card, a semiconductor memory, or a programmable logic circuit, can be used. The program may be supplied to the computer via any transmission medium (a communication network or broadcast waves) capable of transmitting the program. The present invention can also be realized in a form of a data signal embedded in broadcast waves with which the program is realized through electronic transmission.

(Appendixes)

In order to resolve the foregoing problem, according to an embodiment of the present invention, a slave device that is connected to a controller which is a master device via a network and includes a communication port to which a device is connected, the slave device including: an acquisition unit configured to acquire identification information of a device connected to the communication port from the device; and a generation unit configured to generate configuration settings information (configuration information) including identification information of a device scheduled to be connected to the communication port on the basis of the identification information acquired by the acquisition unit.

In the foregoing configuration, the generation unit generates the configuration settings information including the identification information of the device scheduled to be connected to the communication port on the basis of the identification information acquired by the acquisition unit from the device connected to the communication port.

Accordingly, the slave device has the advantageous effect that the configuration settings information can be generated without acquiring the identification information of the device scheduled to be connected to the communication port from a device other than the device. That is, the slave device has the advantageous effect that it is not necessary for a user to manually input and register the identification information of the device scheduled to be connected to the slave device.

With respect to the slave device in the embodiment of the present invention, the slave device may further include an instruction information acquisition unit configured to receive a settings instruction which is an instruction for generating the configuration settings information from the outside. When the instruction information acquisition unit receives the settings instruction, the generation unit may generate configuration settings information including identification information of a device scheduled to be connected to the communication port on the basis of the identification information acquired by the acquisition unit.

In the foregoing configuration, when the instruction information acquisition unit receives the setting instruction which is an instruction for generating the configuration settings information from the outside, the instruction information acquisition unit generates the configuration settings information including the identification information of the device scheduled to be connected to the communication port on the basis of the identification information acquired by the acquisition unit from the device connected to the communication port.

Accordingly, the slave device has the advantageous effect that the configuration settings information can be generated based on the identification information acquired from the device when the setting instruction is received. That is the slave device has the advantageous effect that it is not necessary for a user to manually input and register the identification information of the device scheduled to be connected to the slave device.

With respect to the slave device in the embodiment of the present invention, the slave device may further include an identification information request unit configured to request a device connected to the communication port to transmit identification information of the device. The acquisition unit may acquire the identification information of the device from the device which the identification information request unit requests to transmit the identification information of the device.

In the foregoing configuration, the acquisition unit acquires the identification information of the device from the device which the identification information request unit requests to transmit the identification information of the device.

Accordingly, the slave device has the advantageous effect that the identification information of the device can be acquired from the device receiving the request to transmit the identification information from the identification information request unit and the configuration settings information including the identification information of the device scheduled to be connected to the communication port can be generated based on the acquired identification information.

With respect to the slave device in the embodiment of the present invention, the slave device may further include a collation unit configured to collate the identification information acquired by the acquisition unit with the identification information included in the configuration settings information. The generation unit may generate the configuration settings information in a state in which an instruction is given from outside so that the collation unit does not collate the identification information acquired by the acquisition unit with the identification information included in the configuration settings information.

In the foregoing configuration, the generation unit generates the configuration settings information in a state in which an instruction is given so that the collation unit does not collate the identification information acquired by the acquisition unit with the identification information included in the configuration settings information.

Accordingly, the slave device has the advantageous effect that it is possible to avoid a situation in which the configuration settings information is updated using the identification information acquired by the acquisition unit even when it is necessary for the collation unit to execute the collation.

With respect to the slave device in the embodiment of the present invention, the acquisition unit may further acquire information regarding a transmission size of data defined for each device connected to the communication port from the device. The generation unit may generate the configuration settings information further including the information regarding the transmission size of the data defined for each device acquired by the acquisition unit.

In the foregoing configuration, the slave device generates the configuration settings information including the information regarding the transmission size of the data defined for each device.

Accordingly, for example, the slave device has the advantageous effect that transmission to the network can be efficient by determining a period, a speed, or the like at which the data acquired from the device is transmitted to the network using the information regarding to the transmission size of the data defined for each device.

With respect to the slave device in the embodiment of the present invention, the slave device may communicate with the device by IO-Link (registered trademark).

In the foregoing configuration, the slave device has the advantageous effect that the slave device can communicate with the device by IO-Link (registered trademark).

In order to resolve the foregoing problem, a control method according to an embodiment of the present invention is a control method of a slave device that is connected to a controller which is a master device via a network and includes a communication port to which a device is connected. The control method includes: an acquisition step of acquiring identification information of a device connected to the communication port from the device; and a generation step of generating configuration settings information including identification information of a device scheduled to be connected to the communication port on the basis of the identification information acquired in the acquisition step.

According to the foregoing method, in the generation step, the configuration settings information including the identification information of the device scheduled to be connected to the communication port is generated on the basis of the identification information acquired in the acquisition step from the device connected to the communication port.

Accordingly, the control method has the advantageous effect the configuration settings information can be generated without acquiring the identification information of the device scheduled to be connected to the communication port from a device other than the device. That is, it is possible to obtain the advantageous effect that it is not necessary for a user to manually input and register the identification information of the device scheduled to be connected to the slave device.

The present invention is not limited to the above-described embodiments and can be modified in various forms within the scope described in the claims. Embodiments obtained by appropriately combining technical means disclosed in other embodiments can also be included in the technical scope of the present invention.

The invention claimed is:

1. A slave device that is connected to a controller which is a master device via a network and includes a communication port to which a device is connected, the slave device comprising:
   an acquisition unit configured to acquire identification information of a device connected to the communication port from the device;
   a generation unit configured to generate configuration settings information including identification information of a device scheduled to be connected to the communication port on the basis of the identification information acquired by the acquisition unit; and
   a collation unit configured to collate the identification information acquired by the acquisition unit with the identification information included in the configuration settings information to determine whether the device connected to the communication port is the device scheduled to be connected to the communication port.

2. The slave device according to claim 1, further comprising:
   an instruction information acquisition unit configured to receive a settings instruction which is received externally by the slave device and is an instruction for generating the configuration settings information, wherein, when the instruction information acquisition unit receives the settings instruction, the generation unit generates configuration settings information including identification information of the device scheduled to be connected to the communication port on the basis of the identification information acquired by the acquisition unit.

3. The slave device according to claim 2, further comprising:

an identification information request unit configured to request the device connected to the communication port to transmit identification information of the device, wherein the acquisition unit acquires the identification information of the device from the device which the identification information request unit requests to transmit the identification information of the device.

4. The slave device according to claim 2, further comprising:

a collation unit configured to collate the identification information acquired by the acquisition unit with the identification information included in the configuration settings information, wherein the generation unit generates the configuration settings information in a state in which an instruction is given externally by the slave device so that the collation unit does not collate the identification information acquired by the acquisition unit with the identification information included in the configuration settings information.

5. The slave device according to claim 2, wherein the acquisition unit further acquires information regarding a transmission size of data defined for the device connected to the communication port from the device, and wherein the generation unit generates the configuration settings information further including the information regarding the transmission size of the data defined for the device acquired by the acquisition unit.

6. The slave device according to claim 2, wherein the slave device communicates with the device by IO-Link.

7. The slave device according to claim 1, further comprising:

an identification information request unit configured to request the device connected to the communication port to transmit identification information of the device, wherein the acquisition unit acquires the identification information of the device from the device which the identification information request unit requests to transmit the identification information of the device.

8. The slave device according to claim 7, further comprising:

a collation unit configured to collate the identification information acquired by the acquisition unit with the identification information included in the configuration settings information, wherein the generation unit generates the configuration settings information in a state in which an instruction is given externally by the slave device so that the collation unit does not collate the identification information acquired by the acquisition unit with the identification information included in the configuration settings information.

9. The slave device according to claim 7, wherein the acquisition unit further acquires information regarding a transmission size of data defined for the device connected to the communication port from the device, and wherein the generation unit generates the configuration settings information further including the information regarding the transmission size of the data defined for the device acquired by the acquisition unit.

10. The slave device according to claim 7, wherein the slave device communicates with the device by IO-Link.

11. The slave device according to claim 1, wherein the generation unit generates the configuration settings information in a state in which an instruction is given externally by the slave device so that the collation unit does not collate the identification information acquired by the acquisition unit with the identification information included in the configuration settings information.

12. The slave device according to claim 11, wherein the acquisition unit further acquires information regarding a transmission size of data defined for the device connected to the communication port from the device, and wherein the generation unit generates the configuration settings information further including the information regarding the transmission size of the data defined for the device acquired by the acquisition unit.

13. The slave device according to claim 11, wherein the slave device communicates with the device by IO-Link.

14. The slave device according to claim 1, wherein the acquisition unit further acquires information regarding a transmission size of data defined for the device connected to the communication port from the device, and wherein the generation unit generates the configuration settings information further including the information regarding the transmission size of the data defined for the device acquired by the acquisition unit.

15. The slave device according to claim 14, wherein the slave device communicates with the device by IO-Link.

16. The slave device according to claim 1, wherein the slave device communicates with the device by IO-Link.

17. A non-transitory computer-readable recording medium comprising an information processing program causing a computer to function as the slave device according to claim 1 and causing a computer to function as the acquisition unit, the generation unit and the collation unit.

18. A control method of a slave device that includes a communication port to which a device is connected and is connected to a controller which is a master device via a network, the control method comprising:

an acquisition step of acquiring identification information of a device connected to the communication port from the device;

a generation step of generating configuration settings information including identification information of a device scheduled to be connected to the communication port on the basis of the identification information acquired in the acquisition step; and a collation step of collating the identification information acquired in the acquisition step with the identification information included in the configuration settings information to determine whether the device connected to the communication port is the device scheduled to be connected to the communication port.

* * * * *